United States Patent [19]
Judge et al.

[11] Patent Number: 6,141,174
[45] Date of Patent: Oct. 31, 2000

[54] METHOD OF READING RECORDED INFORMATION FROM A MAGNETIC TAPE THAT COMPENSATES FOR TRACK PITCH CHANGES

[75] Inventors: John S. Judge, Durham, N.H.; Robert A. Johnson, Acton, Mass.

[73] Assignee: Quantum Corporation, Milpitas, Calif.

[21] Appl. No.: 09/135,411

[22] Filed: Aug. 14, 1998

[51] Int. Cl.[7] ..................... G11B 5/00
[52] U.S. Cl. ..................... 360/76; 360/77.12
[58] Field of Search ............... 360/76, 75, 77.12, 360/31

[56] References Cited

U.S. PATENT DOCUMENTS

| | | | |
|---|---|---|---|
| 4,539,615 | 9/1985 | Aari et al. | 360/121 |
| 4,609,959 | 9/1986 | Rudi | 360/106 |
| 5,371,638 | 12/1994 | Saliba | 360/77.12 |
| 5,450,257 | 9/1995 | Tran et al. | 360/76 |
| 5,523,904 | 6/1996 | Saliba | 360/77.12 |
| 5,973,874 | 10/1999 | Panish et al. | 360/76 |

Primary Examiner—Andrew L. Sniezek

[57] ABSTRACT

A method of multi-channel magnetic tape recording and reading that compensates for track pitch changes. The method utilizes a closed loop servo system to adjust lateral and azimuth position of the recording head assembly. Servo information is written at a slight azimuth angle, adjacent the outer most tracks of a band of tracks. The recording angle being based on a dimensional stability coefficient of the tape. After data is written at the initial angle, the azimuth angle of the head is rotated through a predetermined range of angle during read-only to align the outermost read gaps with the servo tracks. By doing so, signal strength is maximized across all tracks, even if track pitch changes.

11 Claims, 5 Drawing Sheets

TRACK NO.

TRACK NO.

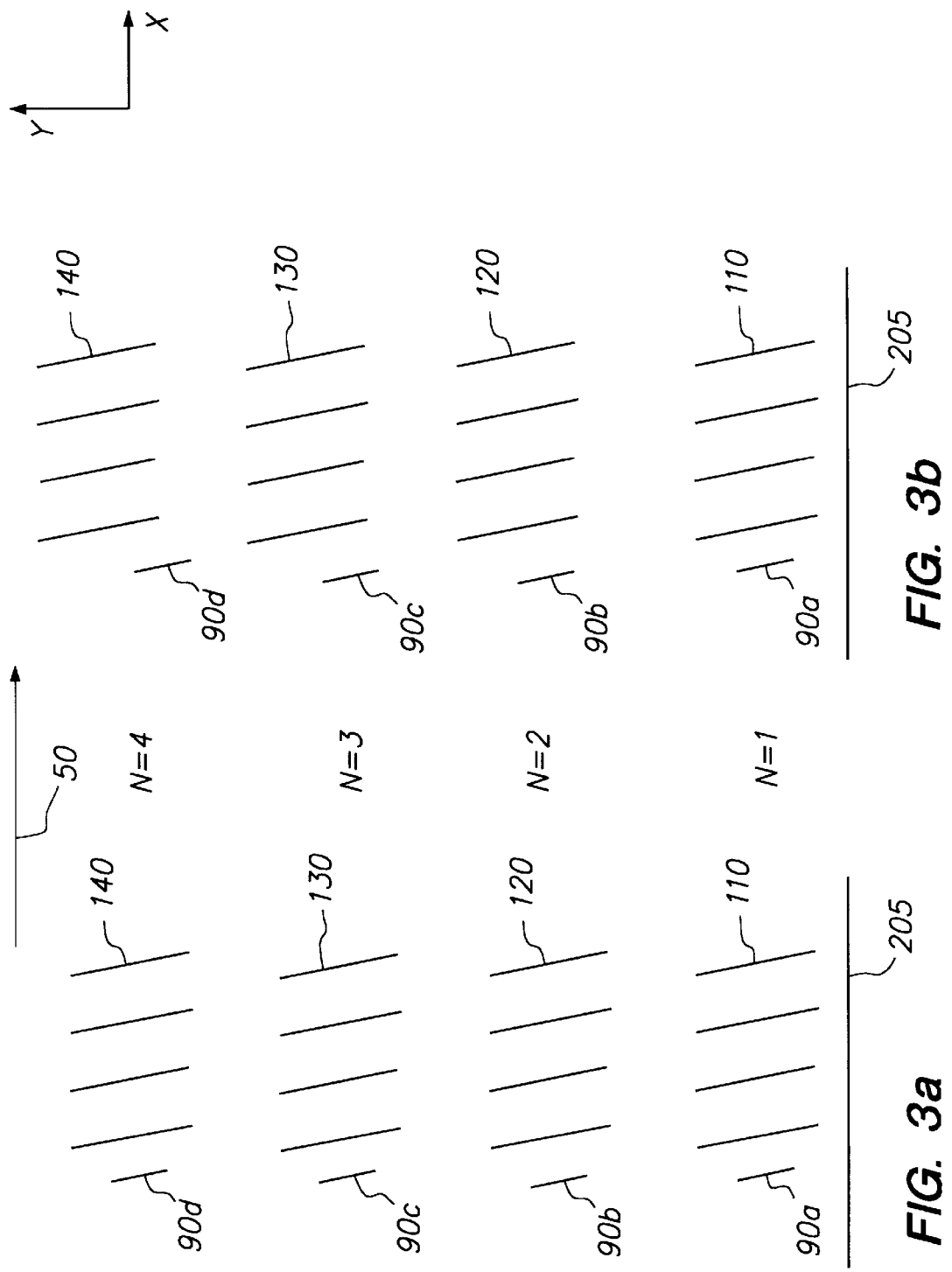

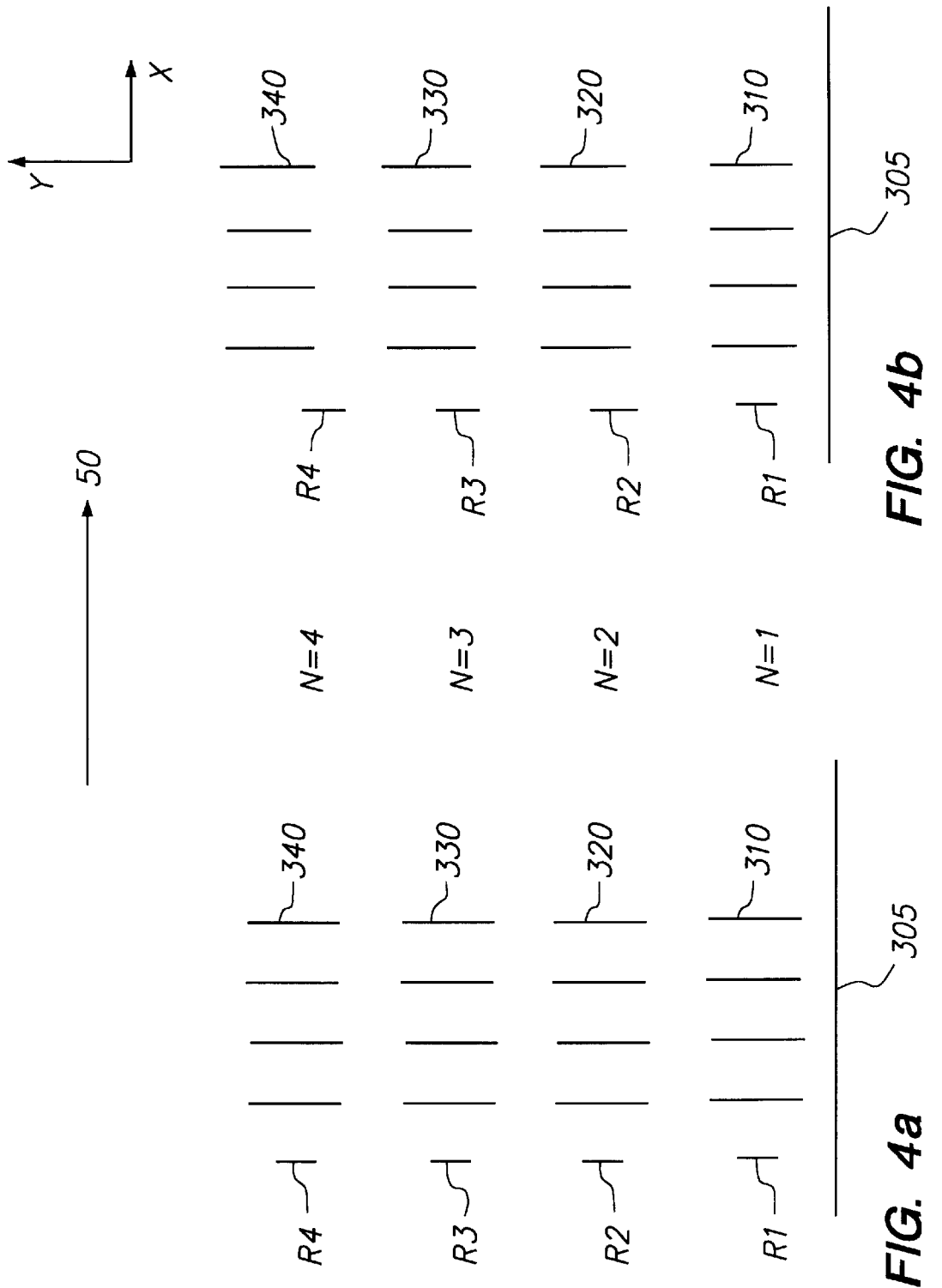

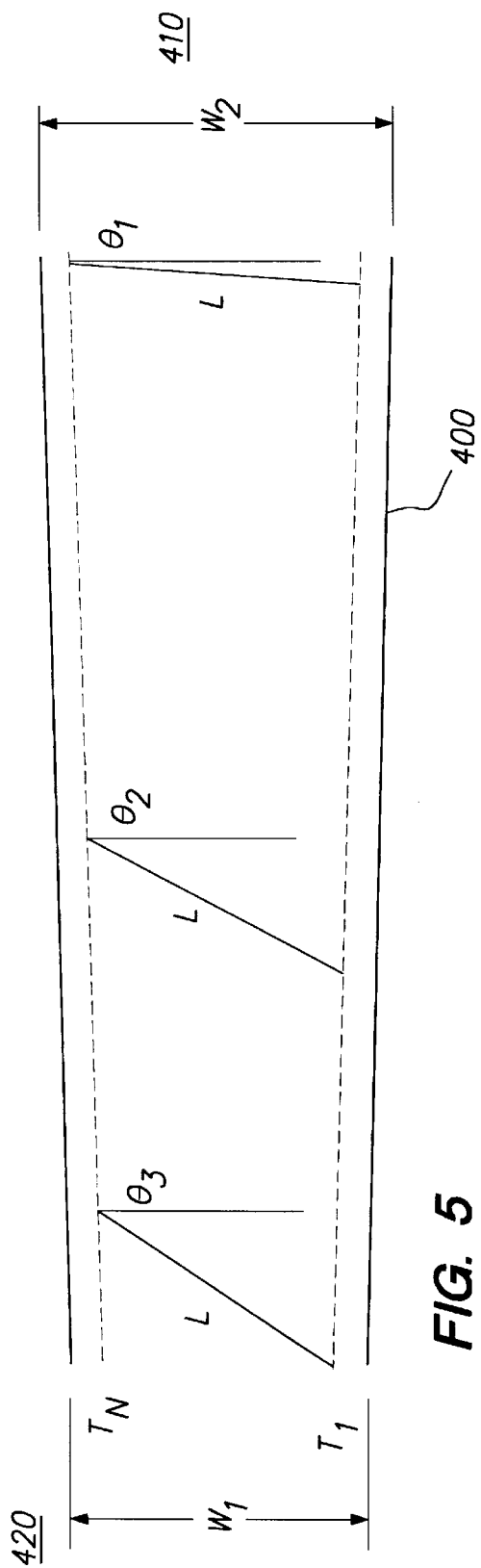
FIG. 5
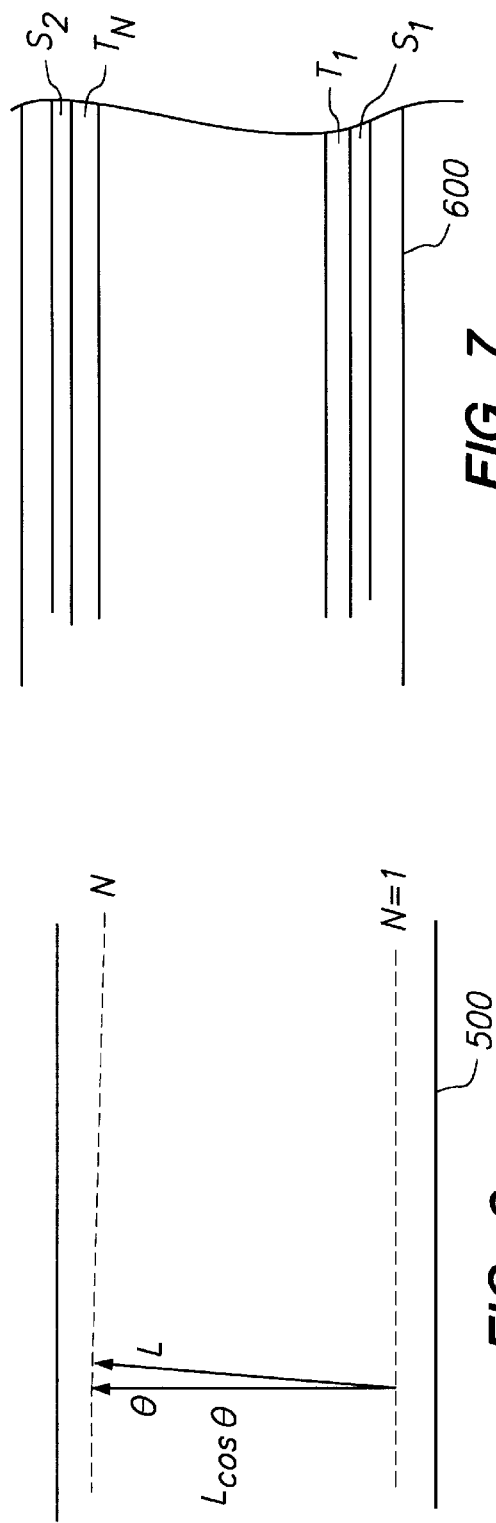
FIG. 7
FIG. 6

METHOD OF READING RECORDED INFORMATION FROM A MAGNETIC TAPE THAT COMPENSATES FOR TRACK PITCH CHANGES

FIELD OF THE INVENTION

The invention relates generally to magnetic tape recording. More specifically, the invention relates to a magnetic tape recording method for reading recorded information that compensates for track pitch changes to the magnetic tape.

BACKGROUND OF THE INVENTION

The constantly increasing operational speeds of digital computers are creating a demand for corresponding increases in the data storage capacities of magnetic tape recording and reproducing systems, while maintaining the special requirements of high speed digital tape systems.

It is desirable that tape recording and reproducing systems for use as computer data storage devices provide high data transfer rates and perform a read check on all written data. Toward those ends, conventional tape systems typically employ methods of recording known as linear recording, as illustrated in FIG. 1a, in which the tracks of data lie parallel to each other and to the edges of the tape; or helical scan recording, as illustrated in FIG. 1b, in which the tracks of data lie parallel to each other but diagonal to the edges of the tape. The linear recording method offers higher data transfer rates because of the ability to record and read multiple tracks simultaneously. As such, the number of tracks that are simultaneously written and read is referred to as a "band". The number of tracks within a band may differ, depending on the number of read/write gaps provided by the multiple channel head. It would be desirable to obtain higher data densities while retaining the advantages of linear recording.

One limitation on track densities is caused by crosstalk, which occurs when reading off one track is interfered with by data of an adjacent track. Crosstalk is further exacerbated by error in head gap alignments. Some methods have been implemented to reduce this effect, such as leaving guard bands between tracks, or by using wider write head gaps. These methods, however, also tend to limit track densities.

A method of recording known as azimuth recording has been used in helical scan systems in order to decrease the effects of crosstalk and thus increase the track density of these systems. Azimuth recording results in a recorded track pattern in which the magnetization directions of adjacent data tracks lie at different azimuth angles to each other as illustrated in FIG. 1c. This method greatly reduces intertrack crosstalk, allowing tracks to be placed closer together. The need for guard bands or wide write heads is thus reduced or eliminated.

One difficulty of high-density multiple channel magnetic recording, that affects all of the above-mentioned recording methods, is lateral tape motion (LTM). LTM is the random and unavoidable tendency for a tape to drift in a direction lateral to the direction of tape motion. During a tape write, lateral tape motion causes track directions to deviate from the parallel to the edge of the tape. During a read, lateral tape motion causes misregistration of the read head over the track being read. This misregistration results in read data error. Further error can be introduced by lateral motion of the write head during writing. To compensate for LTM, servo tracking techniques have been developed to reduce the effects of tracking error and thus improve the data capacity of tape systems. Known servo techniques vary widely, but most involve methods of dynamically moving the read head laterally to continually re-position it over the written data track. The movement of the read head gap compensates for lateral tape motion during a read.

Another difficulty of high-density multiple channel magnetic recording, that also affects all of the above-mentioned recording methods, is misregistration caused by changes in the environmental conditions within a tape drive. Specifically, changes in temperature, humidity and tension within the tape drive environment and stresses developed within the tape pack may cause lateral dimensional changes to the tape, i.e. tape width expansion and contraction. In addition, changes in environmental conditions (e.g. temperature and humidity) may also cause dimensional changes to the read/write head. Unlike LTM, where track pitch remains unchanged, tape expansion/contraction changes the spacing between longitudinal tracks (i.e. track pitch) as well as the relative spacing between the read/write gaps and the longitudinal tracks. If the dimensional change to tape width exceeds a certain percentage of the track width, simultaneous reading of the tracks within a band becomes impossible i.e. the signal strength from a misregistered track becomes undetectable. Particularly, as track density increases (e.g. 500 tracks on a ½ inch wide tape) and track width decreases (e.g. 0.2–0.3 mil read track width and 10–20 channel recording heads), misregistration becomes a greater problem. Prior approaches attempted to simply limit the ratio of the head width to the lateral span of the head. This limits either the track width or the number of tracks that can be utilized. Additionally, adjusting the lateral position of the read/write head would not re-align the read gaps with the data tracks because of the changing track pitch.

Therefore, there remains an unsolved need for a magnetic tape recording method that compensates track misregistration caused by track pitch changes.

SUMMARY OF THE INVENTION WITH OBJECTS

It is an object of the present invention to provide a method of high density magnetic tape recording and reading in a manner overcoming limitations and drawbacks of the prior art.

Specifically, it is an object of the present invention to provide a method of recording and closed loop method of reading recorded data that compensates for track misregistration caused by track pitch changes.

More specifically, it is an object of the present invention to provide a method of recording and reading that compensates for tape track pitch changes using a closed loop servo system. Servo tracks are used to monitor the alignment between read gaps and a corresponding band of tracks. Servo information is first written at two servo tracks, each at or near the outermost data tracks of each band. Information is then recorded at a predetermined azimuth recording angle. The azimuth recording angle being determined as the angle at which the read head is centered on the freshly written track. During read back of the recorded information, the read/write head is continuously rotated, through a predetermined range of angle, in response to feedback from the servo information. By doing so, as will be explained below, the read gaps may be constantly re-aligned with the band of tracks.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the drawings:

FIG. 3a illustrates the relationship between the read gaps of a read/write head and a four channel azimuthal recording pattern.

FIG. 3b illustrates the relationship between the read gaps and recording pattern of FIG. 3a after tape expansion.

FIG. 4a illustrates the relationship between the read gaps of a read/write head and a four channel longitudinal recording pattern.

FIG. 4b illustrates the relationship between the read gaps and recording pattern of FIG. 4a after tape expansion.

FIG. 5 shows how changing the recording azimuth angle enables the two outermost read gaps to maintain alignment with the two outermost tracks of a band as the width of the tape changes.

FIG. 6 illustrates the relationship between the orientation of the read/write head and the distance between the outermost tracks of a band.

FIG. 7 illustrates the position of the servo tracks relative to the outermost data tracks of a band.

DETAILED DESCRIPTION OF A PREFERRED EMBODIMENT

The present invention described herein relates to a method of multiple channel magnetic tape recording. In the following description, numerous specific details are set forth in order to provide a thorough understanding of the present invention. It will be apparent, however, to one skilled in the art, that the present inventions may be practiced without some or all of these specific details. In other instances, well known structures and/or process steps have not been described in detail in order not to unnecessarily obscure the present invention.

Figure 1A:
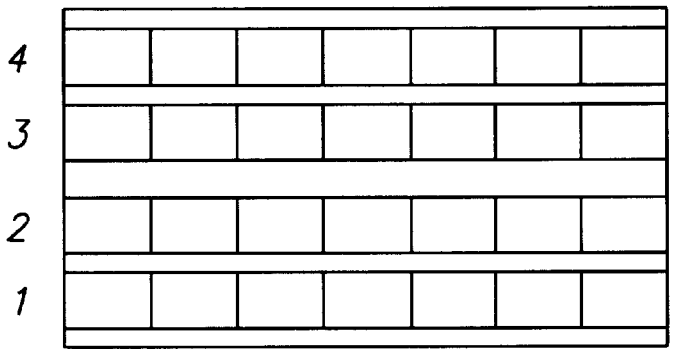
FIGS. 1a, 1b, and 1c illustrate respectively linear, helical, and azimuth recording patterns.
Figure 1B:
Figure 1C:
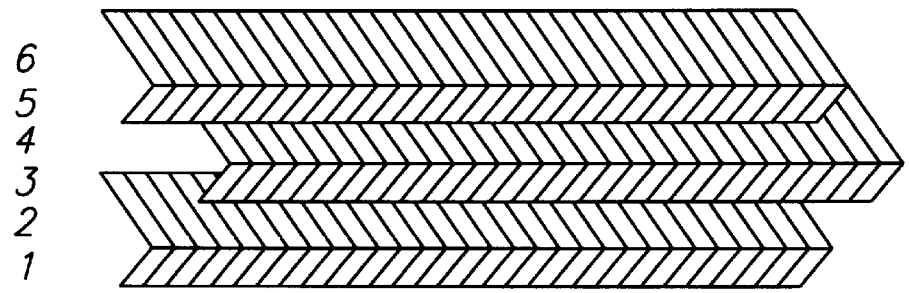
Figure 2:
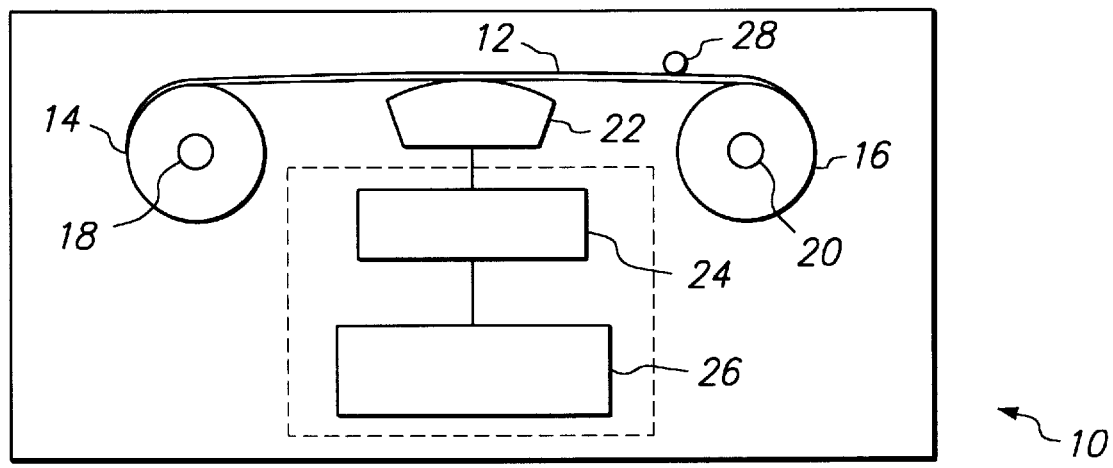
FIG. 2 is schematic view of a magnetic tape system according to the principles of the invention.

FIG. 2 shows a magnetic tape system 10 for azimuth and linear recording at very high track densities on a magnetic tape 12. The tape reels 14 and 16 are mounted on rotatably driven reel drive motors 18 and 20. The reel drive motors 18 and 20 rotate the reels 14 and 16 to move the tape 12 in a forward direction from the reel 14 to the take-up reel 16. As the tape 12 advances, it moves across the magnetic head structure 22, which simultaneously writes a band of longitudinal tracks of data onto the tape 12. The magnetic head structure 22 contains a plurality of separate write and read head gaps, the actual number corresponding to the number of tracks within the band, and thus allowing for simultaneous read checking of written data. When the entire length of the tape 12 has been transferred from the tape reel 14 to the take-up reel 16, the direction of rotation of the reel drive motors 18 and 20 is reversed. The tape 12 now advances across the magnetic head 22 in the reverse direction. As the tape 12 begins to advance in the reverse direction, the magnetic head structure 22 is stepped in a lateral direction across the tape by the magnetic head positioner assembly 24, enabling the simultaneous recording and read checking of another band of information on the tape 12. A controller 26 provides data to be written by the magnetic head structure 22, accepts read data from the magnetic head structure 22, and provides control information to the head positioner assembly 24. The advancement of the tape 12 continues in forward and reverse directions with the magnetic head structure 22 stepped laterally across the tape 12, resulting in multiple parallel recorded bands of tracks. The position of the magnetic head structure 22 relative to the lengthwise location on the tape 12 is continuously monitored by position sensing means such as an optical tachometer 28. (As used herein, the term "longitudinal" relates to the forward and reverse direction of tape travel, whereas "lateral" refers to the direction across the tape).

The present invention uses servo feedback and azimuth control to compensate for track misregistration caused by track pitch changes. Track pitch changes may be caused by expansion or contraction of recording tape relative to the recording head due to changes in environmental conditions.

FIG. 3a illustrates the relationship between read gaps 90a, 90b, 90c, and 90d of a four channel azimuth recording head and the corresponding azimuth recording tracks of data 110, 120, 130, and 140, on tracks 1, 2, 3, and 4. The tracks are shown written in the forward direction 50, relative to the bottom edge 205 of the recording tape 12. As shown, each read gap is approximately ⅓ the width of the written data track so as to tolerate a certain amount of lateral tape movement (LTM) and to avoid reading adjacent tracks. As track density increases, track width will decrease to approximately 0.0002–0.0004 inches for drives currently in production and even smaller in the future, making misregistration an even greater concern.

The present invention is also applicable to linear recording. FIG. 4a illustrates the relationship between read gaps R1, R2, R3, and R4 of a four-channel read-after-write linear recording head and its corresponding written tracks of data 310, 320, 330 and 340, on tracks N=1, 2, 3 and 4. Like the azimuth recording pattern of FIGS. 2a and 2b, the linear recording tracks are similarly shown written in the forward direction 50, relative to a bottom edge 305 of the recording tape.

FIGS. 3b and 4b, respectively, illustrate the relationship between read gaps and the corresponding data tracks after the tape has expanded (in the y-axis direction) and thus, the track pitch has changed. As shown in the exaggerated view of FIG. 4b, track pitch increases so that each track becomes slightly offset such that read gap R4 is only able to read approximately 25% of the data on track 340. The same relationship, i.e. slight offset between read gap and data track, is shown in FIG. 3b. FIGS. 3b and 4b are shown not only in an exaggerated view, but also in a somewhat ideal view, in that the lateral dimension of the tape (width) is shown expanding linearly.

In accordance with principles of the present invention, FIG. 5 shows that by writing at a small azimuth angle θ, relative to the y-axis, small changes in the angle Δθ produce changes in the relative position of tracks in the head relative to the tape. For instance, FIG. 5 shows a tape 400 having different lateral dimensions (i.e. width) at opposite ends. At the right end 410, the tape is shown with a width of w1 and a width of w2 at the opposite end 420. With L representing the distance between the outermost read gaps of a multiple channel read/write head, the outer most read gaps are able to coherently align with the two outermost tracks T1 and Tn, as the tape width changes, by simply changing the recording angle from θ1 to θ3. Thus, assuming δ to be the change in recording angle that enables the read/write head to compensate for the changes to tape lateral dimension, and θ1 to be the initial recording angle, δ may be determined in the following manner.

$$\theta = \theta_1 + \delta \quad (1)$$

Normalizing by $L\cos(\theta_1)$, $$\frac{L\cos(\theta_1 + \delta)}{L\cos(\theta_1)} = \frac{\cos(\theta_1)*\cos(\delta) - \sin(\theta_1)*\sin(\delta)}{\cos(\theta_1)} \quad (2)$$

For small $\delta$, $\cos(\delta) \sim 1 - \delta^2/2, \sin(\delta) \sim \delta$. Terms of order $\delta^2$ and higher may be dropped. Therefore, $$\frac{L\cos(\theta_1 + \delta)}{L\cos(\delta_1)} \sim 1 - \tan(\theta_1)*\delta \quad (3)$$

The last term, $\tan(\theta_1)*\delta$ represents a dimensional stability coefficient of the tape relative to the read/write head and is a characteristic of the tape and the environmental conditions of the tape drive. Thus, "a" may be determined based on a combination of the material properties of the tape and the expected worst case environmental conditions of the tape drive. By letting "a" represent this coefficient, the angle $\delta$ may be represented by $$\delta = a/\tan(\theta_1) \quad (4)$$

If the initial recording angle $\theta_1$ is 0, the effect is initially a second order effect involving only contraction of the length between the outer tracks and the above analysis does not apply. For a Quantum DLT™ 7000 Tape Drive and tape cartridge, $a=0.001$ and $\theta_1=9.41$ degrees, which corresponds to $\delta=0.00603$ radians or 0.346 degrees.

As shown in FIG. 7 two servo tracks S1 and S2 are each defined at or near the outermost data tracks T1 and TN of a band 600 and dedicated for storing servo information. The servo may be magnetically recorded tracks, optically recorded information or any other suitable means of position identification. Preferrably, but not necessarily, the servo tracks are written prior to the tape cartridge being inserted into a tape drive. Each servo track produces a Position Error Signal (PES) which provides a measure of magnitude and direction of the head's relative distance to the servo track being observed. At least one servo track is required for monitoring the lateral position of the tape, relative to the read/write head. A second servo track can be used for monitoring changes to the track pitch. If information is temporarily lost from one servo track, the other servo track can be used alone to position the head laterally. The PES is fed back to the head positioning system such that the head moves in a direction to reduce the PES toward zero. When the head is laterally aligned with the servo tracks, the PES will indicate a resulting average servo value of zero. However, non-zero individual PES's indicates that the two outermost read gaps are not aligned with the servo tracks, and accordingly, the other read gaps are not aligned with the data tracks. As illustrated in FIG. 6, if the width of tape 500 contracts relative to the distance between the outermost read gaps, the two read gaps would be too far apart to detect the outer most data tracks. Alternatively, if tape expands relative to the two read gaps, the read gaps would appear to be too close to each other. In either case, azimuth angle $\theta$ would be adjusted until both PES's are reduced to zero, realigning the read/write head with the data tracks.

Figure 8:
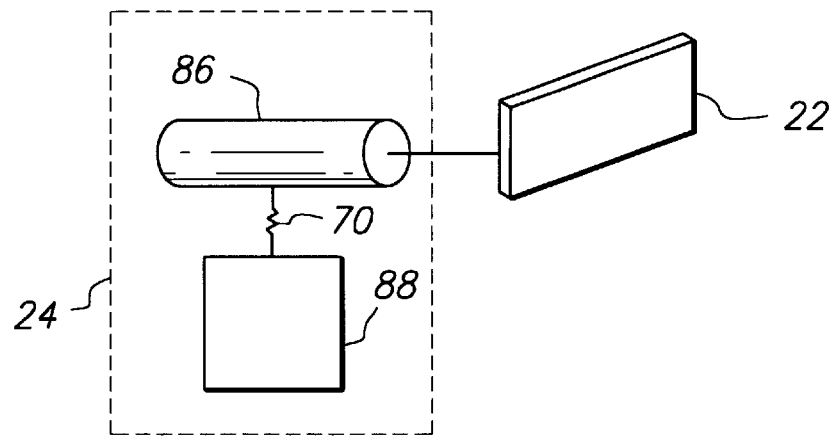
FIG. 8 is a detailed view of the components of the head assembly of FIG. 2.

Referring to FIGS. 2 and 8, the magnetic head structure 22 may be mounted on the head positioner assembly 24, shown in dashed lines in FIG. 8, for lateral and stepped rotatable movement relative to the tape 12. As shown, the magnetic head structure 22 is mounted for movement about the output shaft of a rotary motor 86. The rotary motor 86, which receives input from the controller 26, serves to rotatably step the magnetic head 22 angularly relative to the tape 12. A stepper motor 88, which also receives input from controller 26, serves to engage an actuator 70, shown as a linear actuator in FIG. 8, for moving the magnetic head structure 22 in a lateral or widthwise direction across the tape 12. The stepper motor 88 and the linear actuator 70 are used to adjust the track to track position of magnetic head structure 22. The rotary motor 86 is used for coarse and fine adjustment of the angle of the magnetic head structure 22 relative to the azimuth angle of a given track. An exemplary head positioning structure is described in commonly assigned and copending U.S. patent application Ser. No. 08/557,662, filed Nov. 13, 1995, entitled: "Tape Drive Head Positioning Device for Adjusting Head Tilt and Azimuth". Additionally, an exemplary tape drive controller is disclosed in commonly assigned U.S. Pat. No. 5,307,217, issued on Apr. 26, 1994, the disclosures of both being incorporated herein by reference.

During a write, the read/write head is positioned at an angle $\theta_1$, with $\delta$ being set to zero so that the read gaps are positioned in the center of the corresponding just-written track. Information is simultaneously written to all channels until the end of tape is reached. Almost simultaneously after data is written, read gaps read the written information to verify the integrity. Error correction codes then determine whether detected errors are acceptable or not. If the errors are not acceptable, a portion of the data may be re-written.

During a read-only, when recorded data is read, tape width may have changed, thereby altering track pitch. In accordance with principles of the present invention, read/write head rotates through a predetermined range of angle $\delta$ in response to servo feedback. In the exemplary read/write head 22 of FIG. 4a, read gaps 90a and 90d represent the two outer gaps. The controller, referred to herein above, adjusts the lateral and rotational positions of the read/write head until the (PES) signal strengths from the two servo tracks are minimized in amplitude. At this position, the read gaps 90a and 90d are coherently aligned with the respective outer tracks as well as the tracks therein between. With the head positioning assembly referred to above, the head assembly can be repositioned laterally to adjust and compensate for any LTM and azimuthally to compensate for track pitch changes due to lateral dimensional changes.

In the illustrations provided herein, the multiple channel head is shown with four channels. It should be understood that other variations of multiple channel of recording heads (e.g. 8, 10, 12 channels) are within the scope of the present invention.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method of positioning a read/write head relative a magnetic tape for storing and reading information thereon that compensates for dimensional changes to a tape width, the method comprising:

writing servo information to at least one longitudinal servo track on the tape;

positioning the read/write head at a predetermined recording angle;

writing data to a plurality of data tracks on the magnetic tape;

reading the amplitude of the servo information;

comparing the servo information amplitude to a reference amplitude;

adjusting an angular position of the recording head, relative to the predetermined recording angle, until the servo information amplitude approximates the reference amplitude; and reading the recorded information from the data tracks.

2. The method of claim 1 wherein the step of adjusting the recording angle comprises rotating the recording head about a central axis through a predetermined range of angle.

3. The method of claim 2 wherein the predetermined recording range is determined by an expected change in the tape width dimension.

4. The method of claim 1 wherein the step of writing data further comprises simultaneously writing a band of tracks.

5. The method of claim 4 wherein the at least one servo track comprises two servo tracks, each servo track being adjacent an outer most tracks of each band of tracks.

6. The method of claim 5 wherein the step of adjusting the recording angle of the magnetic head comprises electromechanically rotating the magnetic head about a central axis.

7. The method of claim 5 wherein the step of writing a plurality of data tracks further comprises the step of simultaneously writing a band of tracks.

8. The method of claim 7 wherein the band of tracks includes an two outer most tracks.

9. The method of claim 7 wherein the step of writing a plurality of data tracks further comprises writing a plurality of bands.

10. The method of claim 8 wherein the servo information is written to a track near the two outermost data tracks of each band.

11. A method of aligning read gaps of a multiple channel read/write head with a plurality of longitudinally aligned data tracks defined on a magnetic recording tape, the magnetic tape streaming between a magnetic tape cartridge and a magnetic tape storage subsystem, the tape cartridge including a housing having a central hub with the magnetic tape spooled thereon, the magnetic tape being spooled on to an internal take-up reel rotatably mounted within the magnetic tape storage subsystem, the method comprising the steps of:

determining an expected change in the width of the tape;

determining a recording angle based on the expected change in the width of the tape;

writing servo information to the tape at the recording angle;

writing data to a plurality of data tracks defined on the tape, each track being written at the recording angle;

reading an amplitude of the servo information;

comparing the amplitude of the servo information to a reference amplitude;

adjusting an angular position of the magnetic head, relative to the recording angle, until the servo amplitude approximates the reference amplitude; and reading written information from the data tracks.

* * * * *